Oct. 11, 1966     C. R. DIXON     3,278,720
METHOD AND APPARATUS FOR WELDING METAL MEMBERS
Filed Feb. 12, 1964     2 Sheets-Sheet 1
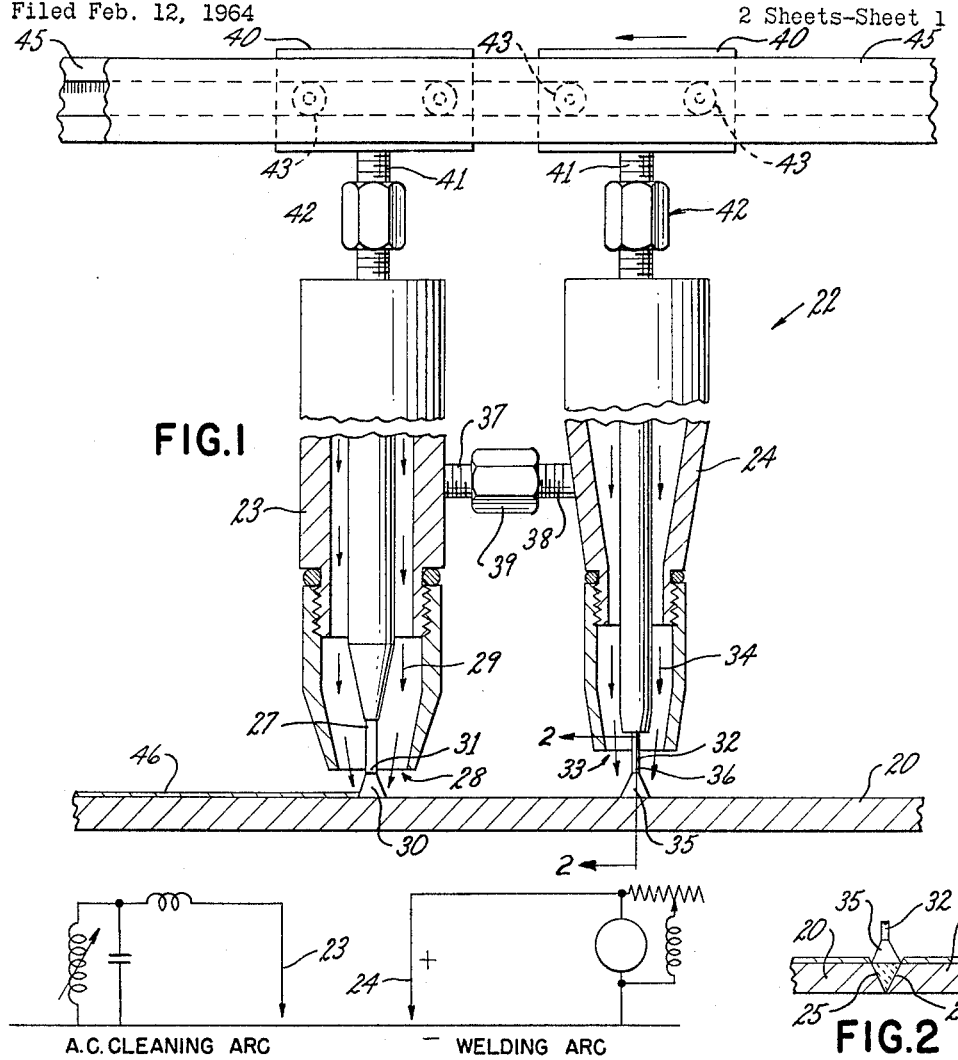
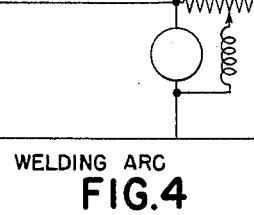
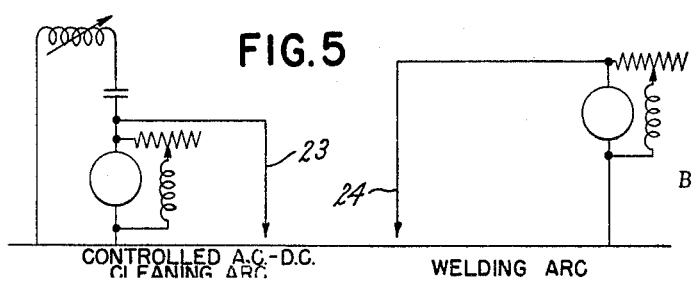
INVENTOR.
CHARLES RALPH DIXON
BY Glenn Palmer
& Matthews
HIS ATTORNEYS

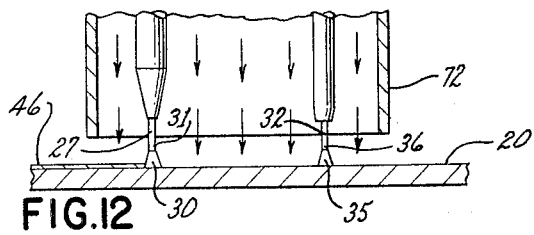
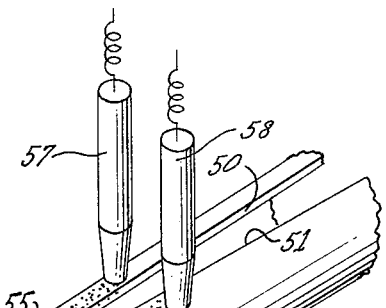
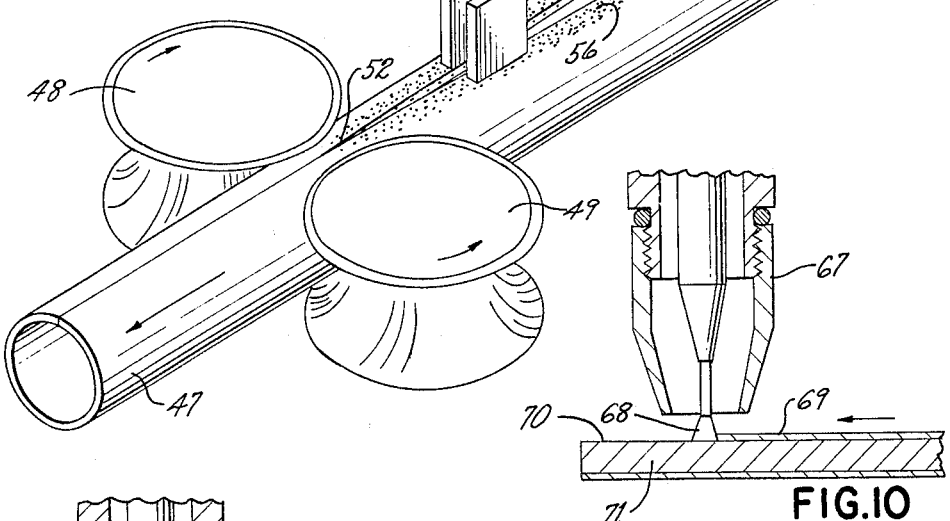
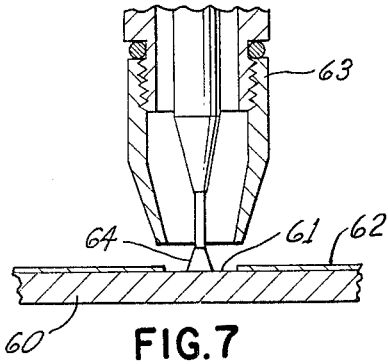
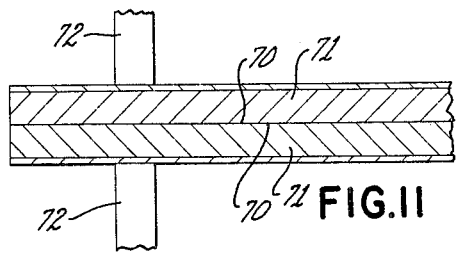
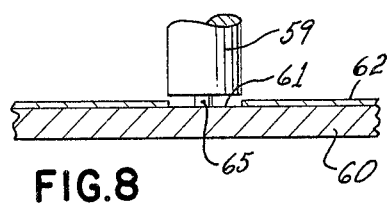
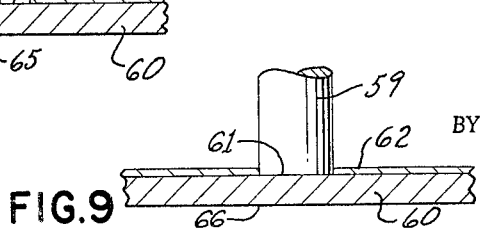
INVENTOR.
CHARLES RALPH DIXON

United States Patent Office 3,278,720
Patented Oct. 11, 1966

3,278,720
METHOD AND APPARATUS FOR WELDING
METAL MEMBERS
Charles Ralph Dixon, Henrico County, Va., assignor to
Reynolds Metals Company, Richmond, Va., a corporation of Delaware
Filed Feb. 12, 1964, Ser. No. 344,365
13 Claims. (Cl. 219—118)

This invention relates to an improved welding apparatus, as well as to an improved method of welding.

It is well known that a contaminated metal surface adversely affects the quality of inert gas shielded metal arc welding, as well as other types of welding, as will be apparent hereinafter.

In particular, the oxide present on aluminum-containing metallic surfaces, together with organic material, water moisture and moisture chemically combined with the oxide, produces gases during the conventional welding operation that cause a poor quality weld, as well as a porosity of the weld.

In addition, contaminated inert gas, water leaks, and inadequate gas coverage can cause the adverse porosity in the weld.

Further, the surfaces of the metal members to be welded together are hard to evaluate and determine the cleanliness that is required for the quality of weld desired.

A degreasing operation is sometimes sufficient. However, it is not always possible to degrease adequately. For example, portions of railroad cars, barge sections, and the like that have been tack welded pick up moisture and grease that cannot be adequately removed prior to the welding operation.

Mechanically removing the oxide and/or contaminated surface of the metal members under controlled conditions will work. However, with heavy fabrication, the wire brush becomes contaminated and foreign bodies are embedded in the metal surfaces whereby it has been found that on a section that has been inadequately mechanically cleaned porosity will show up in the weld. Further, if the weld surface is wire brushed between passes of the welding head, porosity is apt to be present with each pass.

It is also well known that metal surfaces can have the oxide and/or contaminated material thereof removed chemically if the operation is done under adequate control. However, a degreasing operation is required prior to the oxide removal and proper understanding of the deoxidizer is required for optimum results.

Further, it is also well known that chemically clean metallic surfaces are hardly suitable for railroad cars, tanks, barges, and large structures.

However, according to the teachings of this invention, it has been found that oxide and contaminating material removal can be simply and effectively accomplished by utilizing an electric arc in a manner hereinafter described.

For example, it has been found that the electrical resistance measurements show a drop of surface resistance from 5000 microhms to under 50 microhms on aluminum alloy 6061-T6 when the surface has been cleaned according to the teachings of this invention.

A surface that has been electrically cleaned in accordance with the teachings of this invention is substantially surgically clean in that all organic material has been volatilized and the oxide has been reduced to a minimum thickness as determined by a surface resistance measurement.

Accordingly, it is an object of this invention to provide an improved welding apparatus having one or more of the novel features set forth above or hereinafter shown or described.

Another object of this invention is to provide an improved method of welding metallic members.

Other objects, uses and advantages of this invention are apparent from a reading of this description, which proceeds with references to the accompanying drawings forming a part thereof and wherein:

FIGURE 1 is a schematic view illustrating one embodiment of the welding apparatus and method of this invention.

FIGURE 2 is a cross-sectional view taken on line 2—2 of FIGURE 1.

FIGURES 3–5 are respectively electrical diagrams illustrating various electrical systems for operating the cleaning and welding arcs of the apparatus of FIGURE 1.

FIGURE 6 is a schematic, perspective view illustrating another embodiment of the apparatus and method of this invention.

FIGURES 7–9 are respectively side views illustrating a stud welding operation accomplished according to the teachings of this invention.

FIGURES 10 and 11 are respectively side views and illustrate a spot or seam welding operation performed according to the teachings of this invention, FIGURE 12 is a fragmentary cross-sectional view of another embodiment of this invention.

While the various features of this invention are hereinafter described and illustrated as being particularly adaptable for forming particular welding operations, it is to be understood that the various features of this invention can be utilized singly or in any combination thereof to provide other welding operations as desired.

Therefore, this invention is not to be limited to only the embodiments illustrated in the drawings, because the drawings are merely utilized to illustrate one of the wide variety of uses of this invention.

Referring now to FIGURE 1, the improved method and apparatus of this invention for welding together a pair of metal members 20 and 21 (FIGURE 2) by an inert gas shielded metal arc welding operation is generally indicated by the reference numeral 22 and will now be described.

As illustrated in FIGURE 1, the apparatus 22 comprises a cleaning head 23 and a welding head 24 coupled together in a manner hereinafter described to weld together the adjacent beveled surfaces 25 and 26 of the metal members 20 and 21 in a manner hereinafter described.

The cleaning head 23 includes a non-consumable electrode 27, such as tungsten or the like, projecting from the open end 28 of the cleaning head 23, whereby an inert gas 29, such as argon, helium, or any mixture thereof, is adapted to be passed through the cleaning head 23 and be expelled out through the open end 28 of the head 23 to shield an electrical arc 30 produced between the end 31 of the non-consumable electrode 27 and the metallic members 20 and 21 as will be hereinafter described.

The welding head 24 includes a consumable metal electrode 32 adapted to be progressively fed out through the open end 33 of the head 24 in a conventional manner as the electrode 32 is being consumed in the manner hereinafter set forth, the head 24 having means for directing an inert gas 34 therethrough to be expelled out through the open end 33 thereof to shield the electrical metal arc 35 formed between the end 36 of the consumable electrode 32 and the metal members 20 and 21 for a purpose hereinafter described.

The cleaning head 23 is adapted to be adjustably carried by the welding head 24 in any suitable manner, whereby the distance between the cleaning arc 30 and the welding arc 35 can be adjusted for optimum results.

For example, the cleaning head 23 can carry a threaded stud 37 and the welding head 24 can carry a threaded stud 38 coupled to the stud 37 by a conventional turnbuckle 39 so that the position of the cleaning head 23 relative to the welding head 24 can be readily adjusted by the proper rotation of the turnbuckle 39.

While the welding apparatus 22 of this invention can be moved relative to the work 20 and 21 or the work 20 and 21 moved relative to the apparatus 22 in any conventional manner, the embodiment illustrated in the drawing is so constructed and arranged that the apparatus 22 is adapted to be moved relative to the work 20 and 21 from right to left in FIGURE 1.

In particular, the cleaning head 23 and the welding head 24 are respectively interconnected to carriages 40 by stud and turnbuckle arrangements 41, 42 with the carriages 40 carrying rollers 43 rolling on suspended tracks 45, whereby the apparatus 22 can be either manually or automatically progressed from right to left on the track 45 in FIGURE 1, the turnbuckle arrangements 41, 42 permitting individual adjustments of the vertical positions of the heads 23 and 24 relative to the work 20 and 21 while the turnbuckle arrangement 37–39 permits horizontal spacing of the heads 23 and 24.

As previously set forth, the metal members 20 and 21 normally have a contaminated outer surface provided by a relatively thick film 46 of oxide and/or contaminating organic material as illustrated in FIGURE 1 which normally impedes the effectiveness of the inert gas shielded metal arc welding operation.

However, by having the cleaning head 23 preceding the movement of the welding head 24, it has been found that the arc 30 provided by the cleaning head 23 volatilizes at least some of the organic material on the members 20 and 21, as well as reduces the oxide to a minimum thickness in the region of the arc 30 so that the subsequent pass by the welding head 24 produces a superior weld as the consumable electrode 32 is melted by the arc 35 and deposited on the beveled surfaces 25 and 26 of the members 20 and 21 to weld the same together, the inert gases 29 and 34 effectively shielding the arcs 30 and 35 to prevent oxidation during the cleaning and welding operation previously described.

Thus, it can be seen that as the apparatus 22 moves from right to left in FIGURE 1, the cleaning head 23 effectively cleans the weldable surfaces of the members 20 and 21 by the electric arc 30 thereof, so that an effective weld can be provided by the welding head 24.

Once the oxide is removed by the cleaning head 23 and the cleaned surface is again exposed to the atmosphere, oxide is again immediately formed before the welding head 24 performs its weld. However, this reformed oxide is only a small percentage of the thickness of the original oxide whereby an effective weld can be made by the welding head 24.

However, even this small reformed oxide film could be eliminated by shielding both the cleaning electrode 31 and welding electrode 32 by a common inert gas shield provided by a single housing 72 disposed about the electrodes 31 and 32 in the manner illustrated in FIGURE 12.

While the arcs 30 and 35 of the cleaning head 23 and welding head 24 can be produced in any desired manner, reference is made to FIGURES 3, 4 and 5, wherein it can be seen that the arc 35 of the welding head 24 can be produced conventionally while the arc 30 of the cleaning head 23 can be produced by an alternating current, a direct current, or controlled alternating current and direct current combination as illustrated respectively by FIGURES 3, 4 and 5.

However, it is to be understood that the particular electrical systems illustrated are not a limitation on this invention as the arcs 30 and 35 can be produced in any desired manner.

For example, it has been found that the cleaning head 23 can utilize an alternating current of approximately 30 to 40 amps on one-quarter inch of material to be welded but will vary depending on the type and thickness of the oxide film and the linear speed desired. The current to be applied will vary directly with the thickness of the material. Further, a 60 cycle frequency can be utilized, the 60 cycle frequency being impressed with a high frequency which may be from anywhere from 150 kilocycles to 3,000,000 cycles. The voltage of the superimposed high frequency may vary anywhere from 300 to 2500 volts as desired.

Therefore, it can be seen that the apparatus and method 22 of this invention provides a unique and effective inert gas shield metal arc welding operation without requiring the time-consuming and cumbersome mechanical or chemical cleaning operations of the prior art.

However, while an inert gas shield metal arc welding operation has been described, it is to be understood that the features of this invention can be utilized in other types of welding operations as desired.

For example, instead of utilizing a consumable electrode 32 for the welding head 24, the welding head 24 could have a non-consumable tungsten electrode that would be gas shielded in the manner previously described and have a cold wire feed for filler welding material.

In addition, the features of this invention can be readily utilized in direct energy high frequency welding operations.

In particular, reference is made to FIGURE 6 wherein a tubular length of metal material 47 is being continuously formed from a sheet of material being suitably formed and being passed through a pair of forming rollers 48 and 49 to bring opposed edges 50 and 51 of the sheet of material together at the point 52 where the edges 50 and 51 are welded together by the melting taking place at the point 52 as a high frequency current is passed between the power contacts or brushes 53 and 54 respectively disposed against edge surface portions 55 and 56 of the sheet of material.

However, it has been found that one of the problems involved in direct energy high frequency welding of heavy walled tubing in the manner set forth in FIGURE 6 is that localized melting takes place under the brushes 53 and 54 at the points of contact thereof with the portions 55 and 56 of the formed sheet 47 whereby the direct energy high frequency welding operation is adversely affected.

To eliminate this problem, it has been found according to the teaching of this invention, that a pair of cleaning heads 57 and 58 can be mounted in advance of the power contacts or brushes 53 and 54 in the manner illustrated in FIGURE 6 to electrically clean the surfaces 55 and 56 before the particular portions of the surfaces 55 and 56 reach the brushes 53 and 54, the cleaning heads 57 and 58 producing cleaning arcs in the same manner as the cleaning head 23 previously described.

It has been found that the cleaning arcs produced by the cleaning heads 57 and 58 in the manner previously described continually deoxidize and decontaminate the brush areas 55 and 56 of the metal member 47 whereby a low contact resistance is made between the brush area 55 and 56 and the brushes 53 and 54 so that less localized heating under brushes 53 and 54 results. In this manner, a more effective direct energy high frequency welding operation can be produced without the adverse advantages of undue melting under the brushes 53 and 54 of a conventional direct energy high frequency welding operation.

Therefore, it can be seen that this invention is also readily adaptable to provide an improved direct energy high frequency welding apparatus and method.

In addition, this invention is readily adaptable for a stud welding operation (i.e.), welding a stud to one surface of a metal member without affecting the opposed surface thereof.

For example, reference is made to FIGURES 7, 8 and 9 wherein it is desired to weld a stud 59 to a metal member 60 at the surface 61 thereof.

However, the surface 61 of the metal member 60 normally has the film 62 of oxide and other organic materials thereon which impede the conventional stud welding operation.

It has been found that the desired area of the surface 61 of the metal member 60 can be effectively electrically cleaned by a cleaning head 63 of this invention, the cleaning head 63 being formed in the same manner as the cleaning head 23 previously described to provide a cleaning arc 64 which will clean the surface 61 in the desired location.

Thereafter, the stud 59 with a small tip 65 is moved against the cleaned portion 61 of the surface 60 so that when the tip 65 makes contact with the surface 60, a discharge of capacitors starts an arc between the stud 59 and metal member 60, which melts the full diameter of the stud 59 and the corresponding area of the surface 61 of the metal member 60. Thereafter, a hammer blow against the stud 59 completes the weld between the stud 59 and the metal member 60 in the manner illustrated in FIGURE 9 without making a filler or marking on the opposite surface 66 of the metal member 60.

Therefore, it can be seen that this invention provides an improved stud welding operation or the like.

Similarly, the various features of this invention can be utilized to provide an improved resistance welding operation, such as a seam welding or spot welding operation.

For example, reference is made to FIGURES 10 and 11 wherein a cleaning head 67 of this invention is formed in a manner similar to the head 23 previously described and has the arc 68 thereof utilized to clean the oxide film and organic material 69 from the surface 70 of a pair of metal members 71 in the manner illustrated in FIGURE 10.

Thereafter, the two metal members 71 are placed together with the cleaned surfaces 70 thereof in contact with each other whereby conventional resistance welding electrodes 72 can be utilized to provide a resistance weld between the facing surfaces 70 of the metal members 71 in a conventional manner, either by a seaming operation or a spot welding operation as desired.

However, while the resistance welding operation above has the cleaned surfaces being welded together, it is to be understood that the uncleaned surfaces could be welded together with the electrodes 72 being placed against the cleaned surfaces of the metal members 71.

In addition, all four exterior surfaces of the two metal members 71 could be cleaned in the above manner before the same are welded together by the electrodes 72.

Accordingly, it can be seen that this invention is also readily applicable for resistance welding operations.

However, it is to be understood that the various features of this invention can be utilized with other welding operations as desired.

Accordingly, it can be seen that this invention provides improved welding operations by effectively and electrically cleaning the oxide film from the surfaces of aluminum-containing metallic materials or other metallic materials as desired.

Thus, not only does this invention provide an improved welding apparatus or the like, but also this invention provides an improved welding method.

While the form of the invention now preferred has been disclosed as required by the statutes, other forms may be used, all coming within the scope of the claims which follow.

What is claimed is:

1. Apparatus for welding two aluminum-containing metal means together comprising a cleaning means for producing an electrical arc to clean a substantial amount of weld porosity creating oxide means from surface means of said metal means, and means for welding said metal means together with deposited material at said cleaned surface means thereof, said deposited material having a contacting and securing surface engaging and securing to said surface means of said metal means, said deposited material having the majority of its contacting and securing surface only at said cleaned surface means to prevent porosity at the strength portion of said deposited material.

2. Apparatus as set forth in claim 1 wherein said cleaning means merely removes the oxide means of said surface means of said metal means without melting said metal means.

3. Apparatus for metal arc welding two aluminum-containing metal means together comprising a cleaning head for producing an electrical arc to clean a substantial amount of weld porosity creating oxide means from surface means of said metal means, and a welding head for producing an electrical metal arc to weld said metal means together with deposited metallic material at said cleaned surface means thereof, said deposited metallic material having a contacting and securing surface engaging and securing to said surface means of said metal means, said deposited metallic material having the majority of its contacting and securing surface only at said cleaned surface means to prevent porosity at the strength portion of said deposited metallic material.

4. Apparatus as set forth in claim 3 wherein said cleaning head is interconnected to said welding head by interconnecting means.

5. Apparatus as set forth in claim 4 wherein said interconnecting means is adjustable to vary the distance between said heads.

6. Apparatus for metal arc welding two aluminum-containing metal means together comprising a cleaning head for producing an electrical arc to clean a substantial amount of weld porosity creating oxide means from surface means of said metal means, a welding head for producing an electrical metal arc, and means for causing relative movement between said metal means and said heads so that said cleaning head cleans said surface means before said welding head welds said cleaned surface means together by deposited metallic material, said deposited metallic material having a contacting and securing surface engaging and securing to said surface means of said metal means, said deposited metallic material having the majority of its contacting and securing surface only at said cleaned surface means to prevent porosity at the strength portion of said deposited metallic material.

7. A method for welding two aluminum-containing metal means together comprising the steps of cleaning a substantial amount of weld porosity creating oxide means from surface means of said metal means with an electric arc of a cleaning means, and welding said metal means together with deposited material at said cleaned surface means thereof, said deposited material having a contacting and securing surface engaging and securing to said surface means of said metal means, said deposited material having the majority of its contacting and securing surface only at said cleaned surface means to prevent porosity at the strength portion of said deposited material.

8. A method as set forth in claim 7 wherein said cleaning step includes the step of merely removing the oxide means of said surface means of said metal means without melting said metal means.

9. A method as set forth in claim 7 and including the step of forming said cleaning means with a cleaning head having a non-consumable electrode providing said arc between said cleaning means and said surface means.

10. A method for metal arc welding two aluminum-containing metal means together comprising the steps of cleaning a substantial amount of weld porosity creating oxide means from surface means of said metal means with an electrical arc of a cleaning head, and welding said metal means together with a deposited metallic material at said cleaned surface means thereof by an electrical metal arc of a welding head, said deposited metallic material having a contacting and securing surface engaging and securing to said surface means of said metal means, said deposited metallic material having the majority of its contacting and securing surface only at said cleaned surface means to prevent porosity at the strength portion of said deposited metallic material.

11. A method as set forth in claim 10 and including the step of interconnecting said cleaning head to said welding head by interconnecting means.

12. A method as set forth in claim 11 and including the step of adjustably varying the distance between said head with said interconnecting means.

13. A method for metal arc welding two aluminum-containing metal means together comprising the steps of providing a cleaning head for producing an electrical arc to clean a substantial amount of weld porosity creating oxide means from surface means of said metal means, providing a welding head for producing an electrical metal arc, and causing relative movement between said metal means and said heads so that said cleaning head cleans said surface means before said welding head welds said cleaned surface means together with deposited metallic material, said deposited metallic material having a contacting and securing surface engaging and securing to said surface means of said metal means, said deposited metallic material having the majority of its contacting and securing surface only at said cleaned surface means to prevent porosity at the strength portion of said deposited metallic material.

References Cited by the Examiner

UNITED STATES PATENTS

| | | | |
|---|---|---|---|
| 1,256,951 | 2/1918 | Thomson | 219—91 |
| 1,298,590 | 3/1919 | Smith | 219—124 |
| 1,449,206 | 3/1923 | Weed | 219—89 |
| 1,495,272 | 5/1924 | Stresau | 219—60 |
| 2,018,263 | 10/1935 | Ito | 219—99 |
| 2,125,172 | 7/1938 | Kinzel | 148—10 |
| 2,261,694 | 3/1941 | Meenen | 219—81 |
| 2,756,311 | 7/1956 | Persson et al. | 219—130 |
| 2,791,673 | 5/1957 | Arnaud | 219—74 |
| 2,794,108 | 5/1957 | Park | 219—67 |
| 2,906,857 | 9/1959 | Nestor | 219—121 |
| 3,130,294 | 4/1964 | Regnauld | 219—123 |

FOREIGN PATENTS

| | | |
|---|---|---|
| 691,373 | 5/1953 | Great Britain. |
| 898,151 | 6/1962 | Great Britain. |

RICHARD M. WOOD, *Primary Examiner.*